(12) United States Patent
Blattel et al.

(10) Patent No.: US 10,246,631 B2
(45) Date of Patent: Apr. 2, 2019

(54) METHOD OF STIMULATING A SUBTERRANEAN FORMATION USING AN ACID PRECURSOR COMPOSITION

(71) Applicant: Halliburton Energy Services, Inc., Houston, TX (US)

(72) Inventors: Steven Blattel, Porter, TX (US); Eric Davidson, Cults (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/523,270

(22) PCT Filed: Dec. 31, 2014

(86) PCT No.: PCT/US2014/072965
§ 371 (c)(1),
(2) Date: Apr. 28, 2017

(87) PCT Pub. No.: WO2016/108877
PCT Pub. Date: Jul. 7, 2016

(65) Prior Publication Data
US 2017/0335174 A1  Nov. 23, 2017

(51) Int. Cl.
*E21B 43/26* (2006.01)
*C09K 8/72* (2006.01)
*C09K 8/74* (2006.01)
*C09K 8/80* (2006.01)
*E21B 43/25* (2006.01)

(52) U.S. Cl.
CPC .............. *C09K 8/725* (2013.01); *C09K 8/72* (2013.01); *C09K 8/74* (2013.01); *C09K 8/80* (2013.01); *E21B 43/25* (2013.01); *E21B 43/26* (2013.01)

(58) Field of Classification Search
CPC ... C09K 8/74; C09K 8/72; C09K 8/62; C09K 8/68; E21B 43/26; E21B 43/25; E21B 43/261; E21B 43/267; E21B 43/283
See application file for complete search history.

(56) References Cited

U.S. PATENT DOCUMENTS

| | | |
|---|---|---|
| 4,148,360 A | 4/1979 | Watanabe |
| 2010/0252267 A1 | 10/2010 | Harris et al. |
| 2013/0333892 A1 | 12/2013 | McClung |

(Continued)

OTHER PUBLICATIONS

International Search Report and Written Opinion issued in corresponding PCT application No. PCT/US2014/072965, dated Sep. 21, 2015, 17 pgs.

(Continued)

*Primary Examiner* — Zakiya W Bates
(74) *Attorney, Agent, or Firm* — Chamberlain Hrdlicka

(57) ABSTRACT

Methods of stimulating a subterranean formation using an acid precursor composition. A method of stimulating a subterranean formation. The method includes placing a fracturing composition in a subterranean formation. The method includes hydraulically fracturing the subterranean formation with the fracturing composition, to form at least one fracture and a spent fracturing composition. The method includes flushing the subterranean formation. The method includes placing an acid precursor composition in the subterranean formation, the acid precursor composition including an acid precursor. The method includes forming an acid from the acid precursor. The method also includes acidizing the subterranean formation with the formed acid.

20 Claims, 1 Drawing Sheet

(56) References Cited

U.S. PATENT DOCUMENTS

2014/0113843 A1 4/2014 Shumway
2014/0202684 A1 7/2014 Danait et al.

OTHER PUBLICATIONS

M. Al-Mehailani, SPE, N. Abdullah Al-Anzi SPE, A. Gohain, SPE, I. Hussain SPE, and B. Haider,; E. Davidson, B. Macmillan; Carefully Designed Water-Based Drill-In Fluid and Filter Cake Removal System Improve Reservoir Producibility and Reduce Well Completion Costs; SPE 122327; presentation at the 2009 SPE European Formation Damage Conference held in Scheveningen, The Netherlands, May 27-29, 2009. 9 pages.

P. Leschi, G. Demarthon, E Davidson, and D. Clinch; Delayed-Release Acid System for Cleanup of Al Khalij Horizontal Openhole Drains; SPE 98164; presentation at the 2006 SPE International Symposium and Exhibition on Formation Damage Control held in Lafayette, LA, Feb. 15-17, 2006. 9 pages.

Eric Davidson, Steve Blattel, D. Nelson Mcmillan, and Alexandra Morrison; Optimisation of Clean-up of Limestone Production Zones: New Observations; SPE 163344; presentation at the SPE Kuwait International Petroleum Conference and Exhibition held in Kuwait City, Kuwait, Dec. 10-12, 2012. 10 pages.

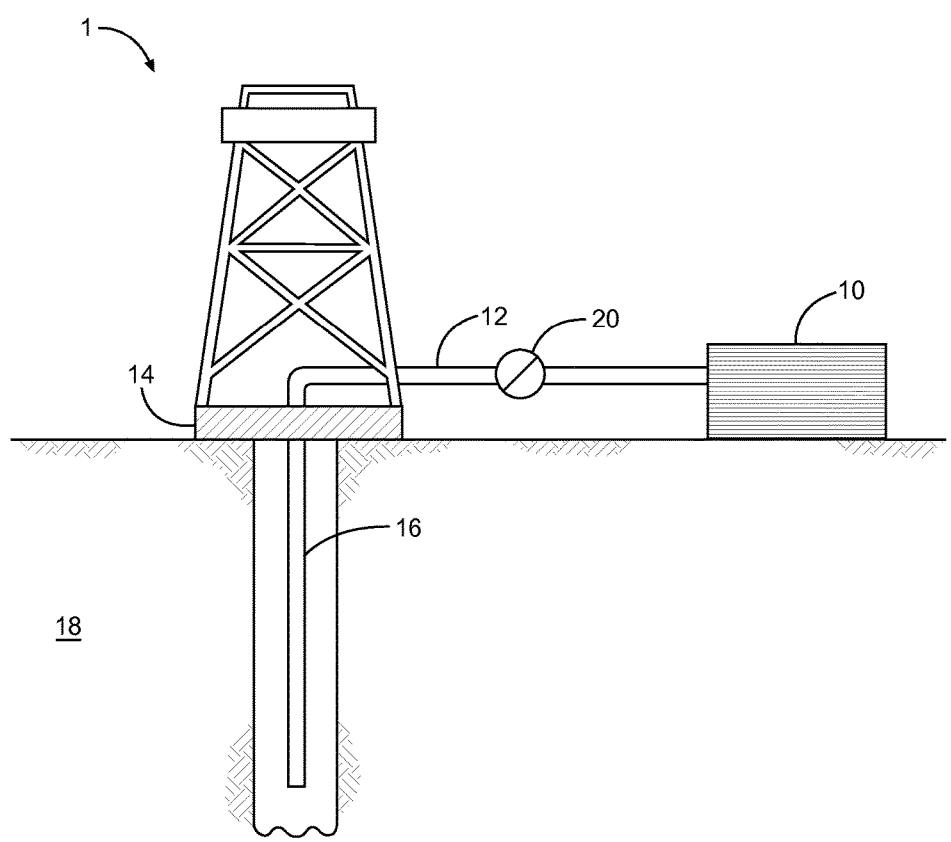

METHOD OF STIMULATING A SUBTERRANEAN FORMATION USING AN ACID PRECURSOR COMPOSITION

BACKGROUND

Acidizing is a process for dissolving material from a formation to improve production. Acidizing fluids have been used to increase the productivity of oil and gas from calcareous formations by effecting the removal of reactive materials from naturally occurring fractures and pore spaces in the formations whereby the sizes thereof are increased. Acidizing fluids also have been used to create new fractures in formations with the acid acting to etch the fractures so that they remain open and have a high flow capacity.

An acidizing fluid can be introduced into the formation only a certain distance before it becomes spent. In creating new fractures in a formation, if the acidizing fluid is pumped under pressure further into the formation after it has become spent, it may extend fractures in the formation, but it may not increase the flow capacities (e.g., via acid-etching) of the extended fractures. Strong mineral acid such as 15% hydrochloric acid can be used to fracture limestone reservoirs with a view to improving production from the rock. The technique generally involves pumping the acid at high pressure into the rock so as to induce a fracture in the rock, and, generally speaking, this fracture will create a dendritic pathway deep into the interior of the rock. The acid dissolves carbonate rock from the walls of the fracture thus etching a pathway through which the produced oil or gas can flow back to the production string. However, the acid spends at the surface of the carbonate rock, and it is thus very difficult for live acid to affect the dimensions of the pore throats that are naturally present in the rock. In other words, the permeability of the limestone in the near-wellbore/near-fracture zone will not be affected by the action of the live acid.

Compounds that can behave as a delayed release source of acid are not effective as the principal active agents in acid fracturing. Generally, the acids released are weak organic acids, and the rate of release of acid, depending on temperature, can be fairly slow. Thus, acid-etching of fractures is very difficult to achieve simply by relying on a delayed release acid.

BRIEF DESCRIPTION OF THE FIGURES

The drawings illustrate generally, by way of example, but not by way of limitation, various embodiments discussed in the present document.

FIG. 1 illustrates a system or apparatus for delivering a composition to a subterranean formation, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O) OR, N(R)C(O)R, N(R)C(S)R, N(R)C(O)N(R)$_2$, N(R)C(S)N (R)$_2$, N(COR)COR, N(OR)R, C(=NH)N(R)$_2$, C(O)N(OR) R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "fracturing fluid" refers to fluids or slurries used downhole during fracturing operations.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "stimulation of a subterranean formation" can include any activity directed to increasing the rate of production of water or petroleum materials from a subterranean petroleum- or water-producing formation or region, for example, including acidizing.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of stimulating a subterranean formation. The method includes placing a fracturing composition in a subterranean formation. The method includes hydraulically fracturing the subterranean formation with the fracturing composition. Hydraulically fracturing the subterranean formation forms at least one fracture and a spent fracturing composition. The method includes flushing the subterranean formation. The method includes placing an acid precursor composition in the subterranean formation. The acid precursor composition includes an acid precursor. The method includes forming an acid from the acid precursor. The method also includes acidizing the subterranean formation with the formed acid.

In various embodiments, the present invention provides a method of stimulating a subterranean formation. The method includes placing a fracturing composition including HCl in a subterranean formation including limestone. The method includes hydraulically fracturing the subterranean formation with the fracturing composition, to form at least one fracture and a spent fracturing composition including $CaCl_2$. The method includes flushing the spent fracturing composition from the at least one fracture. The method includes placing an acid precursor composition in the subterranean formation such that the acid precursor composition penetrates at least about 1 cm into a fracture face of the fracture, the acid precursor composition including an acid precursor. The method includes forming an acid from the acid precursor, including allowing the acid precursor to remain in contact with the fracture for at least 4 times an acid formation half-life of the acid precursor. The method also includes acidizing the fracture with the formed acid.

In various embodiments, the present invention provides a system including a composition including an acid precursor. The system also includes an HCl-containing fracturing composition-fractured and flushed subterranean formation including the composition therein, wherein the subterranean formation includes limestone.

Various embodiments of the present invention provide certain advantages over other methods and compositions for acidizing subterranean formations, at least some of which are unexpected. For example, in various embodiments, the acidizing method can provide a greater increase in permeability of near-wellbore and near-fracture areas (e.g., of the pore structure of near-wellbore and near-fracture areas) than other acidizing methods. Correspondingly, in various embodiments, the acidizing method can provide a greater increase in production rate from various formations, such as from limestone formations, as compared to the increase in production provided by other acidizing methods. In various embodiments, the acidizing method can provide a greater production increase per amount of fracture generated than other methods. For example, in various embodiments, the acidizing method can provide a similar production rate increase as compared to that provided by other methods but with the formation of smaller fractures or with less fracturing.

In various embodiments, the acidizing method can include the use of materials presenting less risk toward health or the environment than other methods. In various embodiments, the acidizing method can employ less expensive materials that those used by other acidizing methods.

Method of Stimulating a Subterranean Formation

In various embodiments, the present invention provides a method of stimulating a subterranean formation. The method includes placing a fracturing composition in a subterranean formation. The placing of the fracturing composition in the subterranean formation can include contacting the fracturing composition and any suitable part of the subterranean formation, or contacting the fracturing composition and a subterranean material, such as any suitable subterranean material.

The subterranean formation can be any suitable subterranean formation. The subterranean formation can include an acid-soluble calcium salt. The subterranean formation can include $CaCO_3$, $CaSO_4$, or a combination thereof. The subterranean formation can include limestone, aragonite, calcite, chalk, marble, travertine, tufa, gypsum, or a combination thereof. The subterranean formation can be a limestone formation.

In some embodiments, the method includes obtaining or providing the fracturing composition. The obtaining or providing of the fracturing composition can occur at any suitable time and at any suitable location. The obtaining or providing of the fracturing composition can occur above the surface. The obtaining or providing of the fracturing composition can occur in the subterranean formation (e.g., downhole).

In some examples, the placing of the fracturing composition in the subterranean formation includes contacting the fracturing composition with or placing the fracturing composition in an area desired to be fractured. The placing of the fracturing composition in the subterranean formation can be any suitable placing and can include any suitable contacting between the subterranean formation and the fracturing composition.

At least one of after and during the placing of the fracturing composition in the subterranean formation, the method includes hydraulic fracturing the subterranean formation with the fracturing composition, such as to generate a fracture. In some embodiments, the fracture can be a dendritic fracture. In some embodiments, the fracture can be an acid-etched fracture (wherein the fracturing composition includes an acid).

Fracturing Composition and Spent Fracturing Composition

The method includes placing a fracturing composition in the subterranean formation, and hydraulically fracturing the subterranean formation with the fracturing composition. The fracturing composition can be any suitable fracturing composition. The fracturing composition can be an aqueous composition. The water in the fracturing composition can be any suitable water, such as water, brine, produced water, flowback water, brackish water, and sea water. The water can include a salt (e.g., brine) that can be any suitable one or more salts, such as at least one of NaBr, $CaCl_2$, $CaBr_2$, $ZnBr_2$, KCl, NaCl, a carbonate salt, a sulfonate salt, a phosphonate salt, a magnesium salt, a bromide salt, a formate salt, an acetate salt, and a nitrate salt. The aqueous liquid can have any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The aqueous liquid can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the water can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more. The aqueous composition can include one or more water-miscible liquids, such as methanol, ethanol, ethylene glycol, propylene glycol, glycerol, and the like.

The fracturing composition can include an acid. The acid can be any suitable proportion of the fracturing composition, such as about 0.01 wt % to about 100 wt % of the fracturing composition, about 1 wt % to about 40 wt % of the fracturing composition, or about 0.01 wt % or less, or about 0.05 wt %, 0.1, 0.5, 1, 2, 3, 4, 5, 6, 8, 10, 12, 14, 16, 18, 20, 25, 30, 35, 40, 45, 50, 55, 60, 65, 70, 75, 80, 85, 90, 95, 96, 97, 98, 99, or about 99.9 wt % or more. The acid can be any suitable acid, such that the acid composition can at least partially etch the fracture faces of the fractures created during the hydraulic fracturing. The acid can be an organic acid, such as at least one of acetic acid, formic acid, lactic acid, citric acid, oxalic acid, uric acid, glutaric acid, glutamic acid, glycolic acid, malonic acid, tartaric acid, adipic acid, sulfamic acid, chloroacetic acid, phthalic acid, a monoaminopolycarboxylic acid, a polyaminopolycarboxylic acid, a salt thereof, an ester thereof (e.g., a ($C_1$-$C_{20}$)hydrocarbyl ester thereof), and a combination thereof. The acid can be a mineral acid, such as at least one of hydrochloric acid, sulfuric acid, fluoric acid, nitric acid, phosphoric acid, hydrobromic acid, and perchloric acid. In some embodiments, the acid is or includes hydrochloric acid.

The hydraulic fracturing of the subterranean formation with the fracturing composition generates a spent fracturing composition. The spent fracturing composition can be similar to the fracturing composition, but the acid can be neutralized from acidization of the subterranean formation and the composition can include byproducts formed from acid-dissolution of various components of the subterranean formation. For example, the spent fracturing composition can include $CaCl_2$ (e.g., formed from $Ca^{+2}$ ions from the dissolved formation and with $Cl^-$ ions from at least one of the acid and salts present in the aqueous composition). In some examples, the spent fracturing composition can include $MgCl_2$ (e.g., when the subterranean formation includes dolomite).

Flushing the Subterranean Formation

After placing the fracturing composition in the subterranean formation and hydraulically fracturing the subterranean formation with the fracturing composition, the method can include flushing the subterranean formation. The flushing can be performed once or multiple times. The flushing can include flushing the spent fracturing composition from the subterranean formation. The flushing can include flushing the spent fracturing composition from the fracture formed by the hydraulic fracturing of the subterranean formation. Flushing the spent fracturing composition from the subterranean formation can help to reduce or avoid formation of byproducts formed by reaction of the spent fracturing composition and acid formed by the acid precursor, such as insoluble byproducts formed from a reaction of $CaCl_2$ in the spent fracturing fluid and the acid formed by the acid precursor.

The flushing can be performed in any suitable fashion, using any suitable volume of flushing composition, such that the spent fracturing composition is substantially removed (e.g., moved away from or diluted) from the area of the subterranean formation desired to be acidized by the acid formed from the acid precursor. In some embodiments, the flushing can include producing (e.g., producing a petroleum composition) from the subterranean formation for sufficient time to clear the spent fracturing composition from the area desired to be acidized by the acid formed from the acid precursor.

In some embodiments, the flushing can include injecting a flushing composition into the subterranean formation. In addition to displacing spent fracturing fluid, the flushing composition can aid in removing debris from the fracture or flow path, preconditioning the fracture faces for accepting the acid precursor, or a combination thereof. Examples of flushing compositions for use in the methods of the present invention can include aqueous fluids, organic- or oil-based-based fluids, or gas-based fluids (e.g., as foams or gasses). A liquid flushing composition can include, for example, fresh water, salt water, brine, diethylene glycol monomethyl ether, diethylene glycol dimethyl ether, ethylene glycol monobutyl ether, diethylene glycol monobutyl ether, dipropylene glycol monomethyl ether, or any combination thereof.

Placing an Acid Precursor Composition in the Subterranean Formation

Following the flushing, the method includes placing an acid precursor composition in the subterranean formation. The placing of the acid precursor in the subterranean formation can include placing the acid precursor in the subterranean formation such that it contacts the formation that is desired to be acidized by the acid formed from the acid precursor. The placing of the acid precursor composition in the subterranean formation can include placing the acid precursor composition such that it penetrates at least about 1 cm into a fracture face of the fracture desired to be acidized by the acid formed from the acid precursor, or about 1 cm to about 10 m, about 5 cm to about 2 m, or about 1 cm or less, or about 2 cm, 3, 4, 5, 6, 7, 8, 9, 10, 12, 14, 16, 18, 20, 25, 30, 35, 40, 45, 50, 55, 60, 65, 70, 75, 80, 85, 90, 95 cm, 1 m, 1.5 m, 2, 3, 4, 5, 6, 7, 8, 9 m, or about 10 m or more. The fracture face penetrated by the acid precursor can be the entire fracture face or can be one or more sections of the entire fracture face. The fracture face penetrated by the acid precursor can be of uniform thickness across the area of penetration, or can be uneven. The concentration of the acid precursor in the penetrated fracture face can be substantially homogeneous or can be uneven, such as a gradient from the face of the fracture to the deepest point of penetration. At the deepest point of penetration, any suitable concentration of the acid precursor can be present. In various embodiments, the penetrated fracture face is penetrated sufficiently by the acid precursor such that upon formation of the acid from the acid precursor the permeability of the near-fracture zone and near-well bore areas by the effect of acidization from the acid.

The method can include obtaining or providing the acid precursor composition. The obtaining or providing of the acid precursor composition can occur above-surface. The obtaining or providing of the acid precursor composition can occur in the subterranean formation.

The acid precursor composition can be an aqueous composition. The water in the acid precursor composition can be any suitable water, such as water, brine, produced water, flowback water, brackish water, and sea water. The acid precursor composition can include one or more water-miscible liquids, such as methanol, ethanol, ethylene glycol, propylene glycol, glycerol, and the like.

The acid precursor composition includes one or more acid precursors. The one or more acid precursors can form any suitable proportion of the acid precursor composition, such that the method can be performed as described herein, such as about 0.01 wt % to about 100 wt % of the acid precursor composition, about 1 wt % to about 80 wt % of the acid precursor composition, or about 0.01 wt % or less, or about 0.05 wt %, 0.1, 0.5, 1, 2, 3, 4, 5, 6, 7, 8, 9, 10, 12, 14, 16, 18, 20, 25, 30, 35, 40, 45, 50, 55, 60, 65, 70, 75, 80, 85, 90, 95, 96, 97, 98, 99, or about 99.9 wt % or more.

The acid precursor can be a hydrolyzable acid precursor, wherein hydrolysis of the hydrolyzable acid precursor gives an acid. The acid precursor can be an ester of acetic acid, an ester of formic acid, an ester of propionic acid, an ester of glycolic acid, an ester of lactic acid, or a homo- and hetero-dimer, oligomer, or polymer of a hydroxy-substituted acids such as lactic acid or glycolic acid.

In some embodiments, the acid precursor can be a) a substituted or unsubstituted ($C_1$-$C_{20}$)hydrocarbyl ester of a substituted or unsubstituted ($C_1$-$C_{20}$)hydrocarbon including at least one carboxylic acid group. For example, the acid precursor can be a substituted or unsubstituted ($C_1$-$C_{20}$) hydrocarbyl ester of a substituted or unsubstituted ($C_1$-$C_{20}$) alkanoic acid, such as a ($C_1$-$C_5$)alkyl ester of a substituted or unsubstituted ($C_1$-$C_5$)alkanoic acid. The acid precursor can be a substituted or unsubstituted ($C_1$-$C_{20}$)hydrocarbyl ester, such as a ($C_1$-$C_5$)alkyl ester, of at least one of formic acid, acetic acid, lactic acid, glycolic acid, and propionic acid. For example, the acid precursor can be ethyl lactate, ethyl formate, methyl formate, methyl lactate, triethyl citrate, and methyl trichloroacetate. The acid precursor can be a ($C_1$-$C_5$)alkyl ester of a mono- or poly-hydroxy substituted ($C_1$-$C_5$)alkanoic acid. The acid precursor can be a pentafluorophenyl ester of a substituted or unsubstituted ($C_1$-$C_{20}$) alkanoic acid.

In some embodiments, the acid precursor can be b) a homo- or hetero-anhydride of a substituted or unsubstituted ($C_1$-$C_{20}$)hydrocarbon including at least one carboxylic acid group. For example, the acid precursor can be a homo- or hetero-anhydride of a substituted or unsubstituted ($C_1$-$C_{20}$) alkanoic acid, such as of a substituted or unsubstituted ($C_1$-$C_5$)alkanoic acid. The acid precursor can be a homo- or hetero-anhydride of at least one of formic acid, acetic acid, lactic acid, glycolic acid, and propionic acid. The acid precursor can be a homo- or hetero-anhydride of a mono- or poly-hydroxy substituted ($C_1$-$C_5$)alkanoic acid.

In some embodiments, the acid precursor can be c) a homo- or hetero-dimer, oligomer, or polymer of a hydroxyl-substituted ($C_1$-$C_{20}$)alkanoic acid. For example, the acid precursor can be lactide or glycolide.

In some embodiments, the acid precursor can be d) a substituted or unsubstituted poly($C_1$-$C_{20}$)alkanoate ester of a substituted or unsubstituted polyhydroxy($C_1$-$C_{20}$)hydrocarbon. For example, the acid precursor can be glycerol triacetate or glycerol diacetate. For example, the acid precursor can be a partially or fully acetylated polysaccharide.

In some embodiments, the acid precursor can be e) a mono- or poly-(($C_2$-$C_5$)alkylene) glycol substituted or unsubstituted di($C_1$-$C_{20}$)alkanoate. The acid precursor can be a polyethylene glycol di($C_1$-$C_5$)alkanoate. For example, the acid precursor can be a polyethylene glycol diester such as diformate. The acid precursor can be diethylene glycol diformate or ethylene glycol monoformate.

The acid precursor can include any one or any combination of acid precursors described herein. For example, in some embodiments, the acid precursor is a combination of two or more of a), b), c), d), and e). In some embodiments, the acid precursor is only one of a), b), c), d), and e).

Other examples of acid precursors can include acid precursor salts and organic acid systems. An acid precursor salt can be any salt that can form an acid, such as a mineral acid, such as HCl or HF. In some embodiments, the acid precursor salt can be a hydrofluoride precursor salt chosen from a fluoride or bifluoride salt (e.g., hydrogen difluoride salt) of a substituted or unsubstituted ($C_1$-$C_{50}$) hydrocarbyl having at least one amine or amide functional group thereon (e.g., in reaction product of an amine and HF), an inorganic fluoride (e.g., potassium fluoride) or bifluoride salt (e.g., sodium bifluoride or potassium bifluoride), a tetra(($C_1$-$C_{10}$) hydrocarbyl)ammonium fluoride, ammonium fluoride, ammonium bifluoride, an alkali or ammonium tetrafluoroborate salt, an alkali or ammonium hexafluorophosphate salt, and polyvinylpyridinium fluoride. In some embodiments, the acid precursor salt can be a hydrochloride precursor salt, such as an amide hydrochloride salt, such as a hydrochloride salt of a substituted or unsubstituted ($C_1$-$C_{50}$)hydrocarbyl having at least one amide functional group thereon, formamide hydrochloride, di($C_1$-$C_{10}$)hydrocarbylformamide hydrochloride, dimethylformamide hydrochloride, acetamide hydrochloride, di($C_1$-$C_{10}$)hydrocarbylacetamide hydrochloride, dimethylacetamide hydrochloride, carbamimidoylurea hydrochloride, urea hydrochloride, imidourea hydrochloride (e.g., guanidine hydrochloride), and combinations thereof. In cases where hydrocarbyl groups are part of the structure of the amide hydrochloride, each hydrocarbyl is independently selected. In some embodiments, the amide hydrochloride salt is urea hydrochloride.

In some embodiments, a material hydrolyzable to form an acid, such as a solid form of the material, can be combined with an acid-reactive material, such that the combined solid rapidly degrades upon the initiation of acid generation to allow rapid hydrolysis of the hydrolyzable material to form the acid. Acid-reactive materials that can be useful for increasing the rate of dissolution and hydrolysis of a solid acid-precursor can include magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass.

Forming an Acid from the Acid Precursor and Acidizing the Subterranean Formation with the Formed Acid After placing the acid precursor composition in the subterranean formation, the method includes forming an acid from the acid precursor and acidizing the subterranean formation (e.g., the near-wellbore and near-fracture zone areas) with the formed acid. The forming of the acid from the acid precursor can include allowing the acid precursor to remain under subterranean conditions surrounding the placed acid precursor composition for a sufficient time to form the acid from the acid precursor. For example, for hydrolyzable acid precursors, forming the acid from the acid precursor can include hydrolyzing the acid precursor to form the acid.

The forming of the acid from the acid precursor can include allowing the acid precursor to remain under subterranean conditions surrounding the placed acid precursor composition for a time of at least about 1 half-lives of a hydrolysis reaction of the acid precursor under the subterranean conditions surrounding the placed acid precursor composition to form the acid from the acid precursor, or for about 1 to 200 half-lives, at least about 4 half-lives, or about 1 half-life or less, or about 2 half-lives, 3, 4, 5, 6, 7, 8, 9, 10, 12, 14, 16, 18, 20, 25, 30, 40, 50, 75, 100, 125, 150, 175, or about 200 half-lives or more of a hydrolysis reaction of the acid precursor under the subterranean conditions surrounding the placed acid precursor composition to form the acid from the acid precursor. The half-life of the hydrolysis reaction is a function of the ambient conditions, such as the ambient temperature of the subterranean formation, e.g., about 25° C. to about 250° C., or about 50° C. to about 175° C., or about 25° C. or less, or about 30° C., 40, 50, 60, 70, 80, 90, 100, 110, 120, 130, 140, 150, 160, 170, 180, 190, 200, 210, 220, 230, 240, or about 250° C. or more. In some embodiments, forming the acid precursor includes allowing the acid precursor to remain in place for about 1 minute to about 5 years, about 1 minute to about 48 hours, about 10 minutes to about 10 hours, or about 1 minute or less, or about 2 minutes, 3, 4, 5, 10, 15, 20, 25, 30, 35, 40, 45, 50, 55 minutes, 1 hour, 1.5 hour, 2, 3, 4, 5, 6, 8, 10, 12, 14, 16, 18, 20, 22 hours, 1 day, 1.5 days, 2, 3, 4, 5, 6, 8, 10, 20 days, 1 month, 2 months, 4, 6, 8 months, 1 year, 2 years, 3, 4, or about 5 or more years.

The method includes leaving the formed acid in place for any suitable amount of time such that the formed acid increases the permeability of the surrounding areas, e.g., of the near-wellbore or near-fracture zone areas. The formed acid can be left in place for about 1 minute to about 5 years, about 1 minute to about 48 hours, about 10 minutes to about 10 hours, or about 1 minute or less, or about 2 minutes, 3, 4, 5, 10, 15, 20, 25, 30, 35, 40, 45, 50, 55 minutes, 1 hour, 1.5 hour, 2, 3, 4, 5, 6, 8, 10, 12, 14, 16, 18, 20, 22 hours, 1 day, 1.5 days, 2, 3, 4, 5, 6, 8, 10, 20 days, 1 month, 2 months, 4, 6, 8 months, 1 year, 2 years, 3, 4, or about 5 or more years.

Chelating Agent

The fracturing composition, the acid precursor composition, a medium used to flush the subterranean formation, or a mixture including any one of the same, can optionally include a chelating agent. In some embodiments, the fracturing composition, the acid precursor composition, a medium used to flush the subterranean formation, or a mixture including any one of the same is free of a chelating agent. The chelating agent can be any suitable chelating agent. The chelating agent can form any suitable proportion of the fracturing composition, the acid precursor composition, a medium used to flush the subterranean formation, or a mixture including any one of the same, such as about 5 wt % to about 60 wt %, about 10 wt % to about 20 wt %, or about 5 wt % or less, or about 10 wt %, 15, 20, 25, 30, 35, 40, 45, 50, 55, or about 60 wt % or more.

In some embodiments, the chelating agent is at least one chosen from an aminopolycarboxylate, a gluconate, an organophosphonate, and a glucoheptonate. The chelating agent can be at least one chosen from polyaspartic acid, methylglycine diacetic acid (MGDA), glutamic acid N,N-diacetic acid (GLDA), L-aspartic acid N,N-diacetic acid (ASDA), cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, diethanolglycine/2-hydroxyethyliminodiacetic acid (DEG/HEIDA), iminodisuccinic acid (IDS), hydroxyethylene iminodisuccinic acid (HIDS), N-bis[2-(1,2-dicarboxyethoxy)ethyl]glycine(BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), ethylenediaminedisuccinic acid (EDDS), diethylenetriaminepentaacetic acid (DTPA), hydroxyethylethylenediaminetriacetic acid (HEDTA), 1,3-propylenediaminetetraacetic acid (1,3-PDTA), nitrilotriacetic acid (NTA), gluconic acid, glucoheptonic acid, sodium tripolyphosphate (STPP), trisodium phosphate (TSP), aminotris(methylene phosphonic acid) (ATMP), ethylenediamine tetra(methylene phosphonic acid) (EDTMP), diethylenetriamine penta(triethylene phosphonic acid)) (DTPMP), 1-hydroxy ethylidene-1,1-diphosphonic acid (HEDP), phosphonobutanetricarboxylic acid (PBTC), hexamethylenediamine tetra(methylene phosphonic acid)) (HDTMP), N-(2-acetamido)iminodiacetic acid (ADA), hydroxymethyl-iminodiacetic acid, 2-(2-carboxyethylamino)succinic acid (CEAA), 2-(2-carboxymethylamino)succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, citric acid, tartaric acid, maleic acid, and a salt of any member of the preceding list (e.g., any suitable salt, such as a sodium, potassium, ammonium, calcium, or lithium salt). In some embodiments, the chelating agent is at least one chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA).

Other Components

The fracturing composition, the acid precursor composition, a medium used to flush the subterranean formation, or a mixture including any one of the same, can include any suitable additional component in any suitable proportion, such that the method can be performed as described herein.

In some embodiments, the fracturing composition, the acid precursor composition, a medium used to flush the subterranean formation, or a mixture including any one of the same, includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the fracturing composition, the acid precursor composition, a medium used to flush the subterranean formation, or a mixture including any one of the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C-C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N-$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinyl alcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the fracturing composition, the acid precursor composition, a medium used to flush the subterranean formation, or a mixture including any one of the same, can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly $((C_1-C_{20})$alkenyl)-substituted mono- or poly-$(C_1-C_{20})$alkyl ether (e.g., pentaerythritol allyl ether), and a poly$(C_2-C_{20})$alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the fracturing composition, the acid precursor composition, a medium used to flush the subterranean formation, or a mixture including any one of the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the fracturing composition, the acid precursor composition, a medium used to flush the subterranean formation, or a mixture including any one of the same, can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu_{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the fracturing composition, the acid precursor composition, a medium used to flush the subterranean formation, or a mixture including any one of the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The fracturing composition, the acid precursor composition, a medium used to flush the subterranean formation, or a mixture including any one of the same, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the fracturing composition, the acid precursor composition, a medium used to flush the subterranean formation, or a mixture including any one of the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In some embodiments, the fracturing composition, the acid precursor composition, a medium used to flush the subterranean formation, or a mixture including any one of the same, can include any suitable amount of any suitable material used in a downhole fluid. For example, the fracturing composition, the acid precursor composition, a medium used to flush the subterranean formation, or a mixture including any one of the same, can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, crosslinkers, breakers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. Any suitable proportion of the fracturing composition, the acid precursor composition, a medium used to flush the subterranean formation, or a mixture including any one of the same can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %

In various embodiments, the fracturing composition, the acid precursor composition, a medium used to flush the subterranean formation, or a mixture including any one of the same, can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The fracturing composition, the acid precursor composition, a medium used to flush the subterranean formation, or a mixture including any one of the same can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus

In various embodiments, the present invention provides a system. The system can be any suitable system that can perform or be generated by performance of a method for using the composition described herein. The system can include a composition including an acid precursor. The system can also include an HCl-containing fracturing composition-fractured and flushed subterranean formation including the composition including the acid precursor therein. The subterranean formation can include limestone. In some embodiments, the system can include a tubular, and a pump configured to pump the composition into the subterranean formation through the tubular.

Various embodiments provide systems and apparatus configured for performing the method. In various embodiments, the system or apparatus can include a pump fluidly coupled to a tubular (e.g., any suitable type of oilfield pipe, such as pipeline, drill pipe, production tubing, and the like), with the tubular containing a composition including the fracturing composition or acid precursor composition described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of an acid from the fracturing composition or the acid precursor from the acid precursor composition therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of stimulating a subterranean formation, the method comprising:

placing a fracturing composition in a subterranean formation;

hydraulically fracturing the subterranean formation with the fracturing composition, to form at least one fracture and a spent fracturing composition;

flushing the subterranean formation;

placing an acid precursor composition in the subterranean formation, the acid precursor composition comprising an acid precursor;

forming an acid from the acid precursor; and acidizing the subterranean formation with the formed acid.

Embodiment 2 provides the method of Embodiment 1, wherein the method comprises increases a rate of production of the subterranean formation.

Embodiment 3 provides the method of any one of Embodiments 1-2, wherein the subterranean formation comprises an acid-soluble calcium salt.

Embodiment 4 provides the method of any one of Embodiments 1-3, wherein the subterranean formation comprises $CaCO_3$, $CaSO_4$, or a combination thereof.

Embodiment 5 provides the method of any one of Embodiments 1-4, wherein the subterranean formation comprises limestone, aragonite, calcite, chalk, marble, travertine, tufa, gypsum, or a combination thereof.

Embodiment 6 provides the method of any one of Embodiments 1-5, wherein the subterranean formation comprises limestone.

Embodiment 7 provides the method of any one of Embodiments 1-6, wherein the method further comprises obtaining or providing the fracturing composition, wherein the obtaining or providing of the fracturing composition occurs above-surface.

Embodiment 8 provides the method of any one of Embodiments 1-7, wherein the method further comprises obtaining or providing the fracturing composition, wherein the obtaining or providing of the fracturing composition occurs in the subterranean formation.

Embodiment 9 provides the method of any one of Embodiments 1-8, wherein the fracturing composition is an aqueous composition.

Embodiment 10 provides the method of any one of Embodiments 1-9, wherein the fracturing composition comprises an acid.

Embodiment 11 provides the method of Embodiment 10, wherein the acid is about 0.01 wt % to about 100 wt % of the fracturing composition.

Embodiment 12 provides the method of any one of Embodiments 10-11, wherein the acid is about 1 wt % to about 40 wt % of the fracturing composition.

Embodiment 13 provides the method of any one of Embodiments 10-12, wherein the acid is at least one of acetic acid, formic acid, lactic acid, citric acid, oxalic acid, uric acid, glutaric acid, glutamic acid, glycolic acid, malonic acid, tartaric acid, adipic acid, sulfamic acid, chloroacetic acid, phthalic acid, a monoaminopolycarboxylic acid, a polyaminopolycarboxylic acid, a salt thereof, an ester thereof, and a combination thereof.

Embodiment 14 provides the method of any one of Embodiments 10-13, wherein the acid comprises a mineral acid.

Embodiment 15 provides the method of any one of Embodiments 10-14, wherein the acid comprises at least one of hydrochloric acid, sulfuric acid, fluoric acid, nitric acid, phosphoric acid, hydrobromic acid, and perchloric acid.

Embodiment 16 provides the method of any one of Embodiments 10-15, wherein the acid comprises hydrochloric acid.

Embodiment 17 provides the method of any one of Embodiments 1-16, wherein the hydraulic fracturing comprises forming at least one fracture in the subterranean formation.

Embodiment 18 provides the method of Embodiment 17, wherein the fracture is a dendritic fracture.

Embodiment 19 provides the method of any one of Embodiments 17-18, wherein the fracture is an acid-etched fracture.

Embodiment 20 provides the method of any one of Embodiments 1-19, wherein the spent fracturing composition comprises $CaCl_2$.

Embodiment 21 provides the method of any one of Embodiments 1-20, wherein the flushing comprises flushing the spent fracturing composition from the subterranean formation.

Embodiment 22 provides the method of any one of Embodiments 1-21, wherein the hydraulic fracturing comprises forming at least one fracture in the subterranean formation, wherein the flushing comprises flushing the spent fracturing composition from the at least one fracture.

Embodiment 23 provides the method of any one of Embodiments 1-22, wherein the flushing comprises injecting a flushing composition into the subterranean formation.

Embodiment 24 provides the method of any one of Embodiments 1-23, wherein the flushing comprises producing from the subterranean formation.

Embodiment 25 provides the method of any one of Embodiments 1-24, wherein the method further comprises obtaining or providing the acid precursor composition, wherein the obtaining or providing of the acid precursor composition occurs above-surface.

Embodiment 26 provides the method of any one of Embodiments 1-25, wherein the method further comprises obtaining or providing the acid precursor composition, wherein the obtaining or providing of the acid precursor composition occurs in the subterranean formation.

Embodiment 27 provides the method of any one of Embodiments 1-26, wherein the hydraulic fracturing comprises forming at least one fracture in the subterranean formation, wherein the placing of the acid precursor composition in the subterranean formation comprises contacting the acid precursor composition and the fracture.

Embodiment 28 provides the method of Embodiment 27, wherein the placing of the acid precursor composition in the subterranean formation comprises placing such that the acid precursor composition penetrates at least about 1 cm into a fracture face of the fracture.

Embodiment 29 provides the method of any one of Embodiments 27-28, wherein the placing of the acid precursor composition in the subterranean formation comprises placing such that the acid precursor composition penetrates about 1 cm to about 10 m into a fracture face of the fracture.

Embodiment 30 provides the method of any one of Embodiments 27-29, wherein the placing of the acid precursor composition in the subterranean formation comprises placing such that the acid precursor composition penetrates about 5 cm to about 2 m into a fracture face of the fracture.

Embodiment 31 provides the method of any one of Embodiments 1-30, wherein the acid precursor composition is an aqueous composition.

Embodiment 32 provides the method of any one of Embodiments 1-31, wherein the acid precursor is about 0.01 wt % to about 100 wt % of the acid precursor composition.

Embodiment 33 provides the method of any one of Embodiments 1-32, wherein the acid precursor is about 1 wt % to about 80 wt % of the acid precursor composition.

Embodiment 34 provides the method of any one of Embodiments 1-33, wherein the acid precursor is a hydrolyzable acid precursor, wherein hydrolysis of the hydrolyzable acid precursor gives an acid.

Embodiment 35 provides the method of any one of Embodiments 1-34, wherein the acid precursor is at least one of a) a substituted or unsubstituted $(C_1-C_{20})$hydrocarbon comprising at least one carboxylic acid group, wherein the carboxylic acid group is in the form of a substituted or unsubstituted $(C_1-C_{20})$hydrocarbyl ester or anhydride thereof, b) a homo- or hetero-anhydride of a substituted or unsubstituted $(C_1-C_{20})$hydrocarbon comprising at least one carboxylic acid group, c) a homo- or hetero-dimer, oligomer, or polymer of a hydroxyl-substituted $(C_1-C_{20})$alkanoic acid, d) a substituted or unsubstituted poly$(C_1-C_{20})$alkanoate ester of a substituted or unsubstituted polyhydroxy$(C_1-C_{20})$hydrocarbon, and e) a mono- or poly-$((C_2-C_5)$alkylene) glycol substituted or unsubstituted di$(C_1-C_{20})$alkanoate.

Embodiment 36 provides the method of any one of Embodiments 1-35, wherein the acid precursor is a substituted or unsubstituted $(C_1-C_{20})$hydrocarbyl ester of a substituted or unsubstituted $(C_1-C_{20})$alkanoic acid.

Embodiment 37 provides the method of any one of Embodiments 1-36, wherein the acid precursor is homo- or hetero-anhydride of a substituted or unsubstituted $(C_1-C_{20})$ alkanoic acid.

Embodiment 38 provides the method of any one of Embodiments 1-37, wherein the acid precursor is a $(C_1-C_5)$ alkyl ester of a substituted or unsubstituted $(C_1-C_5)$alkanoic acid.

Embodiment 39 provides the method of any one of Embodiments 1-38, wherein the acid precursor is a $(C_1-C_5)$ alkyl ester or anhydride of a mono- or poly-hydroxy substituted $(C_1-C_5)$alkanoic acid.

Embodiment 40 provides the method of any one of Embodiments 1-39, wherein the acid precursor is a substituted or unsubstituted $(C_1-C_{20})$hydrocarbyl ester or anhydride of at least one of formic acid, acetic acid, lactic acid, glycolic acid, and propionic acid.

Embodiment 41 provides the method of any one of Embodiments 1-40, wherein the acid precursor is a polyethylene glycol di$(C_1-C_5)$alkanoate.

Embodiment 42 provides the method of any one of Embodiments 1-41, wherein the acid precursor is at least one of diethylene glycol diformate, ethylene glycol monoformate, ethyl lactate, ethyl formate, methyl formate, glycerin diacetate, and methyl lactate.

Embodiment 43 provides the method of any one of Embodiments 1-42, wherein the forming of the acid from the acid precursor comprises allowing the acid precursor to remain under subterranean conditions surrounding the placed acid precursor composition for a sufficient time to form the acid from the acid precursor.

Embodiment 44 provides the method of any one of Embodiments 1-43, wherein the acid precursor is a hydrolyzable acid precursor, wherein the forming the acid from the acid precursor comprises hydrolyzing the acid precursor to form the acid.

Embodiment 45 provides the method of Embodiment 44, wherein the forming of the acid from the acid precursor comprises allowing the acid precursor to remain under subterranean conditions surrounding the placed acid precursor composition for a time of at least about 1 half-lives of a hydrolysis reaction of the acid precursor under the subterranean conditions surrounding the placed acid precursor composition to form the acid from the acid precursor.

Embodiment 46 provides the method of any one of Embodiments 44-45, wherein the forming of the acid from the acid precursor comprises allowing the acid precursor to remain under subterranean conditions surrounding the placed acid precursor composition for a time of about 1 to 200 half-lives of a hydrolysis reaction of the acid precursor under the subterranean conditions surrounding the placed acid precursor composition to form the acid from the acid precursor.

Embodiment 47 provides the method of any one of Embodiments 44-46, wherein the forming of the acid from the acid precursor comprises allowing the acid precursor to remain under subterranean conditions surrounding the placed acid precursor composition for a time of at least about 4 half-lives of a hydrolysis reaction of the acid precursor under the subterranean conditions surrounding the placed acid precursor composition to form the acid from the acid precursor.

Embodiment 48 provides the method of any one of Embodiments 1-47, wherein the hydraulic fracturing comprises forming at least one fracture in the subterranean formation, wherein acidizing the subterranean formation with the formed acid comprises acidizing the fracture.

Embodiment 49 provides the method of any one of Embodiments 1-48, wherein at least one of the fracturing composition and the acid precursor composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 50 provides the method of any one of Embodiments 1-49, wherein the fracturing composition further comprises a proppant, a resin-coated proppant, or a combination thereof.

Embodiment 51 provides the method of any one of Embodiments 1-50, wherein the acid precursor composition further comprises a proppant, a resin-coated proppant, or a combination thereof.

Embodiment 52 provides the method of any one of Embodiments 1-51, wherein the placing of at least one of the fracturing composition and the acid precursor composition in the subterranean formation comprises pumping the fracturing composition or the acid precursor composition through a tubular disposed in a wellbore and into the subterranean formation.

Embodiment 53 provides a system for performing the method of any one of Embodiments 1-52, the system comprising:
a tubular disposed in the subterranean formation; and
a pump configured to pump the fracturing composition and the acid precursor composition in the subterranean formation through the tubular.

Embodiment 54 provides a method of stimulating a subterranean formation, the method comprising:
placing a fracturing composition comprising HCl in a subterranean formation comprising limestone;
hydraulically fracturing the subterranean formation with the fracturing composition, to form at least one fracture and a spent fracturing composition comprising $CaCl_2$;
flushing the spent fracturing composition from the at least one fracture;
placing an acid precursor composition in the subterranean formation such that the acid precursor composition penetrates at least about 1 cm into a fracture face of the fracture, the acid precursor composition comprising an acid precursor;
forming an acid from the acid precursor, comprising allowing the acid precursor to remain in contact with the fracture for at least 4 times an acid formation half-life of the acid precursor; and
acidizing the fracture with the formed acid.

Embodiment 55 provides a system comprising:
a composition comprising an acid precursor; and
a HCl-containing fracturing composition-fractured and flushed subterranean formation comprising the composition therein, wherein the subterranean formation comprises limestone.

Embodiment 56 provides the system of Embodiment 55, further comprising
a tubular disposed in the subterranean formation; and
a pump configured to pump the composition in the subterranean formation through the tubular.

Embodiment 57 provides the composition, method, or system of any one or any combination of Embodiments 1-56 optionally configured such that all elements or options recited are available to use or select from.

What is claimed is:

1. A method of stimulating a subterranean formation, comprising:
placing a fracturing composition in a subterranean formation;
hydraulically fracturing the subterranean formation with the fracturing composition to form at least one fracture and a spent fracturing composition;
flushing the subterranean formation;
placing an acid precursor composition in the subterranean formation, wherein the precursor composition comprises greater than 7 to about 99 wt. %, based on the total weight of the precursor composition, of an acid precursor;
forming an acid from the acid precursor; and
acidizing the subterranean formation in the fracture with the formed acid.

2. The method of claim 1, wherein the fracturing composition comprises a second acid, and wherein the second acid is about 1 wt % to about 40 wt % of the fracturing composition.

3. The method of claim 2, wherein the second acid is at least one of acetic acid, formic acid, lactic acid, citric acid, oxalic acid, uric acid, glutaric acid, glutamic acid, glycolic acid, malonic acid, tartaric acid, adipic acid, sulfamic acid, chloroacetic acid, phthalic acid, a monoaminopolycarboxylic acid, a polyaminopolycarboxylic acid, a salt thereof, an ester thereof, or any combination thereof.

4. The method of claim 2, wherein the second acid comprises at least one of hydrochloric acid, sulfuric acid, hydrofluoric acid, nitric acid, phosphoric acid, hydrobromic acid, perchloric acid or any combination thereof.

5. The method of claim 2, wherein the second acid comprises hydrochloric acid, and wherein the subterranean formation comprises calcium carbonate, calcium sulfate, or a combination thereof.

6. The method of claim 1, wherein the hydraulic fracturing comprises forming at least one fracture in the subterranean formation, and wherein the fracture is a dendritic fracture or an acid-etched fracture.

7. The method of claim 1, wherein the spent fracturing composition comprises calcium chloride.

8. The method of claim 1, wherein the hydraulic fracturing comprises forming at least one fracture in the subterranean formation, wherein the placing of the acid precursor in the subterranean formation comprises contacting the acid precursor and the fracture, and wherein the placing of the acid precursor in the subterranean formation comprises placing such that the acid precursor penetrates about 5 cm to about 2 m into a fracture face of the fracture.

9. The method of claim 1, wherein the acid precursor comprises a substituted or unsubstituted ($C_1$-$C_{20}$)hydrocarbyl ester of a substituted or unsubstituted ($C_1$-$C_{20}$)alkanoic acid.

10. The method of claim 1, wherein the acid precursor comprises homo- or hetero-anhydride of a substituted or unsubstituted ($C_1$-$C_{20}$)alkanoic acid.

11. The method of claim 1, wherein the acid precursor comprises a ($C_1$-$C_5$)alkyl ester of a substituted or unsubstituted ($C_1$-$C_5$)alkanoic acid.

12. The method of claim 1, wherein the acid precursor comprises a ($C_1$-$C_5$)alkyl ester or anhydride of a mono- or poly-hydroxy substituted ($C_1$-$C_5$)alkanoic acid.

13. The method of claim 1, wherein the acid precursor comprises a substituted or unsubstituted ($C_1$-$C_{20}$)hydrocarbyl ester or anhydride of at least one of formic acid, acetic acid, lactic acid, glycolic acid, propionic acid, or any combination thereof.

14. The method of claim 1, wherein the acid precursor comprises a polyethylene glycol di($C_1$-$C_5$)alkanoate.

15. The method of claim 1, wherein the acid precursor comprises at least one of diethylene glycol diformate, ethylene glycol monoformate, ethyl lactate, ethyl formate, methyl formate, glycerin diacetate, methyl lactate, or any combination thereof.

16. The method of claim 1, wherein the forming the acid from the acid precursor comprises hydrolyzing the acid precursor by maintaining the acid precursor under subterranean conditions for a time of at least about 4 half-lives of a hydrolysis reaction of the acid precursor to produce the formed acid.

17. The method of claim 1, wherein the fracturing composition or the acid precursor further comprises a proppant.

18. A system for performing the method of claim 1, the system comprising:
    a tubular disposed in the subterranean formation; and
    a pump configured to pump the fracturing composition and the acid precursor in the subterranean formation through the tubular.

19. A method of stimulating a subterranean formation, comprising:
    placing a fracturing composition comprising hydrochloric acid in a subterranean formation comprising limestone;
    hydraulically fracturing the subterranean formation with the fracturing composition to form at least one fracture and a spent fracturing composition comprising calcium chloride;
    flushing the spent fracturing composition from the at least one fracture;
    placing an acid precursor composition in the subterranean formation, wherein the acid precursor composition comprises greater than 7 to about 99 wt. %, based on the total weight of the acid precursor composition, of an acid precursor, and wherein the acid precursor penetrates at least about 1 cm into a fracture face of the fracture;
    contacting the acid precursor and the fracture for at least 4 times an acid formation half-life of the acid precursor to produce an acid from the acid precursor; and
    acidizing the subterranean formation in the fracture with the formed acid.

20. A method of stimulating a subterranean formation, comprising:
    placing a fracturing composition comprising a proppant and hydrochloric acid in a subterranean formation;
    hydraulically fracturing the subterranean formation with the fracturing composition to form at least one fracture and a spent fracturing composition comprising calcium chloride;
    flushing the spent fracturing composition from the at least one fracture;
    placing an acid precursor composition in the subterranean formation, wherein the acid precursor composition comprises greater than 7 to about 99 wt. %, based on the total weight of the acid precursor composition, of an acid precursor, and wherein the acid precursor penetrates about 5 cm to about 2 m into a fracture face of the fracture, wherein the acid precursor comprises at least one of diethylene glycol diformate, ethylene glycol monoformate, ethyl lactate, ethyl formate, methyl formate, glycerin diacetate, methyl lactate, or any combination thereof;
    contacting the acid precursor and the fracture for at least 4 times an acid formation half-life of the acid precursor to produce an acid from the acid precursor; and
    acidizing the subterranean formation in the fracture with the formed acid.

* * * * *